United States Patent Office 3,244,622
Patented Apr. 5, 1966

3,244,622
DRILLING FLUID
Charles A. Stratton, Bartlesville, Okla., assignor to
Phillips Petroleum Company, a corporation of Delaware
No Drawing. Filed May 18, 1962, Ser. No. 195,949
9 Claims. (Cl. 252—8.5)

This invention relates to drilling fluids. In one aspect it relates to drilling fluids such as aqueous, oil-base, and emulsion types of drilling fluids used in drilling deep wells such as oil and gas wells. In another aspect it relates to a method for preparing and using a simple drilling fluid which exhibits low fluid loss properties and other desirable rheological properties. In still another aspect the invention relates to a novel composition of matter which has particular utility as a drilling fluid additive.

It is well known that in perforating the earthen formations to tap subterranean deposits such as gas or oil, the perforation is accomplished by well drilling tools and a drilling fluid. The drilling fluid serves to cool and lubricate the drill bit, to carry the cuttings to the surface as the drilling fluid is circulated in and out of the well, to support at least part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of fluids, and to perform other functions as are well known in the drilling art.

It is important that the drilling fluid exhibit a relatively low rate of filtration or fluid loss in addition to having desirable rheological properties such as viscosity and gell strengths. It is also important that the drilling fluid system should be kept as simple and inexpensive as possible in order to avoid undue expense in the drilling of a well.

It is therefore an object of this invention to provide a drilling fluid having low fluid loss characteristics. It is also an object of this invention to provide a novel composition of matter which is useful as a drilling mud additive. Still another object of the invention is to provide a method for controlling the fluid loss properties of a drilling fluid without adversely affecting the rheological properties of the drilling fluid. Still another object is to provide a well-working fluid which is useful in formation fracturing operations. Further objects and advantages of this invention will become apparent to those skilled in the art after studying the disclosure of the invention including the detailed description of the invention.

Broadly, the invention contemplates a novel composition of matter prepared by sulfonating a specific hydrocarbon fraction obtained as a result of a specific sequence of steps performed upon a particular hydrocarbon starting material, which composition of matter is particularly useful as a drilling mud additive for the purpose of reducing the fluid loss characteristics of the drilling fluid. In one specific embodiment the invention contemplates the steps of, and the product obtained by, sulfonating the extract oil from the solvent extraction of a dewaxed, deasphalted oil remaining after removal of SAE 50 lube stock in the propane fractionation of a Mid-Continent lube oil stock with a sulfonating agent, neutralizing the sulfonic acids so produced with a basic monovalent radical, such as an alkali metal radical or the ammonium radical, to produce a salt of the sulfonate of the extract oil and adding the sulfonate so produced to a drilling fluid in an amount sufficient to reduce the fluid loss properties of the drilling fluid.

The extract oil is obtained as a product of a sequence of refining steps practiced on a mixed base crude oil such as a Mid-Continent crude oil.

In the preparation of lubricating oil stocks it is customary to use only virgin stocks which have been selected to provide highly paraffinic products. In order to increase the degree of paraffinicity the topped crude is vacuum distilled, the heavier cuts therefrom are then propane fractionated and the fraction remaining after removal of SAE 50 lube stock is solvent extracted with a solvent such as phenol to produce a raffinate of extremely high parafinicity and an extract oil which is more aromatic than the raffinate but is not of sufficient aromaticity to be affected by mild sulfuric acid treatment such as is customarily applied to refinery crude oils or topped crudes before being charged to the vacuum still. This extract oil is quite consistent in its physical properties regardless of normal variations in the conditions of the various refining steps and has a refractive index of about 1.5472, a specific gravity at 60° F. of 0.996 and a viscosity-gravity constant of about 0.857.

In preparing the sulfonates of this invention the extract oil is dissolved in a suitable nonsulfonatable diluent such as carbon tetrachloride, chloroform, pentane, n-hexane, octanes, gasoline, kerosene, cyclohexane, diesel fuel and the like. A particularly suitable diluent in many cases, especially if the sulfonating agent is sulfur trioxide, is liquid sulfur dioxide. The diluent can be added to the extract oil before the sulfonation reaction and further amounts can be added after sulfonation if such is desired. The diluent can be separated from the sulfonation product by distillation, simple heating, or extraction with suitable solvents. In many cases the diluent need not be separated from the sulfonation product especially if the sulfonate is to be used in preparing an oil-containing drilling fluid such as the oil-base and emulsion types.

In the practice of this invention, oleum (20 percent fuming sulfuric acid) or anhydrous $SO_3$ are the preferred sulfonating agents although other sulfonating agents such as sulfonic acid can be utilized. The sulfonation reaction can be conducted batchwise by adding the sulfonating agent dropwise to the extract oil with agitation; or the sulfonation reaction can be conducted continuously by the simultaneous introduction of sulfonating agent and extract oil to a suitable mixing device such as that disclosed in copending application Serial No. 116,583, filed June 12, 1961, by R. S. Logan. A particularly preferred sulfonating agent is $SO_3$ dissolved in liquid $SO_2$ in which case the extract oil can advantageously be diluted with liquid $SO_2$.

Sulfonation temperatures are usually controlled within the range of about 32 to about 140° F. although sulfonation of the extract oil can be accomplished at temperatures in the broad range of about 0 to about 250° F. At temperatures above about 200° F. excessive oxidation with liberation of $SO_2$ often occurs and therefore the higher temperatures are usually avoided. At temperatures below about 32° F. the reaction time can be appreciable and for this reason the lower temperatures are usually avoided. The ratio of sulfonation agent to extract oil will usually be in the range of about 0.1:1 to 1:1. In batch operations normal hexane is a preferred diluent for the extract oil because of its low vapor pressure at the sulfonation conditions.

The reaction mixture comprising sulfonic acids and diluent can be neutralized directly by adding thereto a basic monovalent radical such as an alkali metal or ammonium radical including sodium hydroxide, ammonium hydroxide, lithium hydroxide and potassium hydroxide or the corresponding carbonates of the ammonium and alkali metals. Any metal sulfonate of the extract oil can be used as a drilling mud additive; however, the alkali metal and ammonium sulfonates are preferred because of their excellent properties of dispersion in aqueous and oil-containing drilling fluids. Other metals which can be employed in certain situations and for particular purposes include magnesium, barium, calcium and strontium in the form of the hydroxide, oxide or carbonate.

After the neutralization step the sulfonate can be allowed to settle and then can be separated by any conventional method such as decantation, centrifugation, filtration or evaporation, to remove therefrom the diluent. The recovered sulfonate can then be dried and ground to produce the drilling mud additive of the invention. The sulfonate obtained in the practice of this invention is a brown colored, brittle solid, apparently amorphous in nature, which is readily dispersible in oil or water.

I have found that superior fluid-loss properties are imparted to water-base or oil-in-water emulsion type drilling fluids by the addition thereto of 1 to 20 pounds per barrel of fluid of the alkali metal or ammonium sulfonate of the extract oil of this invention.

The drilling fluids of this invention can be prepared by any conventional method. The amounts of sulfonate, water and oil employed are dependent upon several variables such as the density of the drilling fluid desired, the nature of the formation penetrated, and other factors that can be readily determined by those skilled in the art upon being apprized of this invention. It has long been customary in rotary drilling operations to subject the drilling fluid to simple, routine tests periodically and these tests are sufficient to indicate the relative amounts of sulfonate, water or oil to be employed. Generally the amount of sulfonate employed will be sufficient to form a relatively thin, impervious filter cake on the wall of the well. In general, the amount of sulfonate added to the drilling fluid will be in the range of about 1 to 20 pounds per barrel (42 U.S. gallons) of drilling fluid.

For water-in-oil emulsion systems the amount of water to be employed will be from as low as 1 percent by weight of the final drilling fluid to 60 percent by weight and usually will be less than 40 percent by weight. For oil-in-water emulsion systems the amount of water will be in the range from about 99 to 60 percent by weight of the final emulsion and the amount of oil will usually be in the range of about 1 to about 40 percent by weight of the final drilling fluid. The oil component used in comparing the oil-base and emulsion drilling fluids of this invention can be any liquid hydrocarbon normally used for this purpose including diesel fuel, crude oil, kerosene, gas oil, heavy fuel oil and various other petroleum fractions.

The drilling fluids of this invention need only contain the water-dispersible and oil-dispersible sulfonated extract oil as the material necessary to obtain desirable rheological properties, especially low fluid loss; however, it is within the scope of this invention to add other finely divided inorganic solids such as clays, finely divided limestone, barite, lead sulfide and the like. As a vehicle for the fracturing formations the sulfonated extract oil will ordinarily be used without added clay.

The following example will be helpful in attaining an understanding of this invention; however, specific details for preparing the sulfonates and drilling fluids of this invention are merely illustrative of a preferred embodiment thereof and are not to be construed as unduly limiting the invention.

EXAMPLE

The extract oil used in the runs reported herein was obtained as the extract phase of the phenol extraction of the material remaining after removal of SAE lube stock in the propane fractionation of a lube oil stock obtained as the vacuum still bottoms obtained from the vacuum distillation of a Mid-Continent topped crude oil. The determined physical properties of the extract oil were as follows: refractive index, 1.5472; specific gravity at 60° F., 0.996; and viscosity-gravity constant, 0.857. The steps of solvent extraction and propane fractionation employed in producing the extract oil are described in "Petroleum Refiner," volume 37, No. 9, September 1958, at pages 275, 276 and 277.

The extract oil was diluted in normal hexane, 300 parts by weight of extract oil in 664.05 parts by weight of normal hexane. The solution was cooled to about 41° F. in an ice bath and 192.3 parts by weight of liquid $SO_3$ were added, with agitation, in increments such that the temperature of the reaction mixtured id not rise above 50° F. Agitation was continued for a short time to assure completion of the reaction and then 100 parts by weight of NaOH were added, with agitation, to neutralize the sulfonic acids formed.

The normal hexane diluent was removed by distillation followed by vacuum drying for 48 hours to produce brown solid which appeared to be amorphous and was sufficiently brittle to be reduced to a powder easily. The powdered material was dispersible in either oil or water.

The powdered product was added to drilling fluids composed of 37.2 pounds of McCracken clay per barrel (42 U.S. gallons) of fluid. Table I shows the results of adding the sodium salts of the sulfonated extract oil, in various amounts, to the drilling fluid.

Sodium sulfonated asphalts were also added to the McCracken clay and water drilling fluids and the results are also shown in Table I. The asphalt was dissolved in a solvent, e.g., carbon tetrachloride, and sulfonated by a procedure similar to that described with respect to the extract oil to prepare the laboratory preparation and the semicommercial preparation. The commercial preparation was purchased. The method for preparing the sulfonated asphalt is disclosed in U.S. Patent 3,028,333, issued to C. A. Stratton et al., on April 3, 1962.

All runs were made according to "Recommended Practice on Standard Field Procedures for Testing Drilling Fluids, API Code #29.

Table 1

| Runs | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Ingredient, gms.: | | | | | | | | | | | | | | | | | | |
| Water | 350 | 350 | 350 | 350 | 350 | 350 | 350 | 350 | 350 | 350 | 350 | 350 | 350 | 350 | 350 | 350 | 350 | 350 |
| Oil | | 15 | | 15 | | 15 | | 15 | | 15 | | 15 | | 15 | | 15 | | 15 |
| McCracken clay | 37.2 | 37.2 | 37.2 | 37.2 | 27.2 | 37.2 | 37.2 | 37.2 | 37.2 | 37.2 | 37.2 | 37.2 | 37.2 | 37.2 | 37.2 | 37.2 | 37.2 | 37.2 |
| Extract oil, sodium sulfonate | | | 5 | 5 | 10 | 10 | 20 | 20 | | | | | | | | | | |
| Additive A [1] | | | | | | | | | 20 | 20 | | | | | | | | |
| Additive B [2] | | | | | | | | | | | 20 | 20 | 20 | 20 | 10 | 10 | 5 | 5 |
| Additive C [3] | | | | | | | | | | | | | | | | | | |
| 30 min. fluid loss | 95.7 | 77 | 17 | 9.4 | 6.6 | 4.5 | 4.2 | 3 | 14.8 | 5.2 | 19.7 | 10 | 18.4 | 10.1 | 29 | 13.8 | 39.2 | 18.2 |

[1] A = Laboratory prepared sodium asphalt sulfonate.
[2] B = Semicommercial sodium asphalt sulfonate.
[3] C = Commercial sodium asphalt sulfonate.

NOTE.—Ingredients are comparable to pounds per barrel (42 U.S. gallons).

It will be noted that in the runs where 20 pounds per barrel of sodium asphalt sulfonate were utilized in water-base drilling fluids the values of fluid loss varied from 14.8 ml. (Run 9) to 19.7 ml. (Run 11) whereas the fluid loss for the sodium sulfonate of the extract oil was only 4.2 ml. (Run 7). The sodium sulfonate of the extract oil is also superior to the sodium sulfonate of asphalt in the emulsion drilling mud, i.e., 5.2 ml. (Run 10) for sulfonated asphalt as compared to 3 ml. (Run 8) for sulfonated extract oil. It should also be noted that when the amount of sulfonated extract oil is cut in half the results are still better than those of the sulfonated asphalt.

The sodium sulfonate of the extract oil has no apparent effect on the gel-strength and viscosity of the drilling fluid. The apparent viscosity of the samples tested was less than 30 centipoise, the initial gel was about 1 lb./100 ft.$^2$, and the 10-minute gel was about 2 lb./100 ft.$^2$. The pH of the samples tested was about 8.

That which is claimed is:

1. In a process of drilling a well with well drilling tools, the step of circulating in said well a drilling fluid selected from the group consisting of aqueous drilling fluids, oil drilling fluids and oil and water emulsion drilling fluids containing, in an amount sufficient to reduce the filtration rate of said drilling fluid, a sulfonated extract oil salt obtained by sulfonating the extract oil from the solvent extraction of a deasphalted, dewaxed oil remaining after removal of SAE 50 lube stock in the propane fractionation of a Mid-Continent lube oil stock and neutralizing the resulting sulfonic acid with a material selected from the group consisting of the hydroxides and carbonates of ammonia, alkali metals and alkaline earth metals.

2. The process of claim 1 wherein the drilling fluid is an aqueous drilling fluid.

3. The process of claim 1 wherein the drilling fluid is an oil and water emulsion drilling fluid.

4. The process of claim 1 wherein the salt of the sulfonated extract oil is present in an amount of about 1 to 20 pounds per barrel of drilling fluid.

5. A well-working fluid comprising a fluid medium selected from the group consisting of water, oil and emulsions of water and oil and a salt selected from the group consisting of the alkali metal salts, the alkaline earth metal salts and the ammonium salt of a sulfonated extract oil obtained from the solvent extraction of a dewaxed, deasphalted oil remaining after removal of SAE 50 lube stock in the propane fractionation of a Mid-Continent lube oil stock, said salt being dispersed in the fluid medium and present in an amount sufficient to reduce the filtration loss of said well-working fluid.

6. An aqueous base drilling fluid comprising water and a salt selected from the group consisting of the alkali metal salts, the alkaline earth metal salts and the ammonium salt of a sulfonated extract oil obtained from the solvent extraction of a dewaxed, deasphalted oil remaining after removal of SAE 50 lube stock in the propane fractionation of a Mid-Continent lube oil stock, said salt being dispersed in the drilling fluid and present in an amount sufficient to reduce the filtration loss of said drilling fluid.

7. An oil-containing drilling fluid comprising oil and a salt selected from the group consisting of the alkali metal salts, the alkaline earth metal salts and the ammonium salt of a sulfonated extract oil obtained from the solvent extraction of a dewaxed, deasphalted oil remaining after removal of SAE 50 lube stock in the propane fractionation of a Mid-Continent lube oil stock, said salt being dispersed in the drilling fluid and present in an amount sufficient to reduce the filtration loss of said drilling fluid.

8. An oil-in-water emulsion drilling fluid comprising an emulsion of oil in water and a salt selected from the group consisting of the alkali metal salts, the alkaline earth metal salts and the ammonium salt of a sulfonated extract oil obtained from the solvent extraction of a dewaxed, deasphalted oil remaining after removal of SAE 50 lube stock in the propane fractionation of a Mid-Continent lube oil stock, said salt being dispersed in the drilling fluid and present in an amount sufficient to reduce the filtration loss of said drilling fluid.

9. A water-in-oil emulsion drilling fluid comprising an emulsion of water in oil and a salt selected from the group consisting of the alkali metal salts, the alkaline earth metal salts and the ammonium salt of a sulfonated extract oil obtained from the solvent extraction of a dewaxed, deasphalted oil remaining after removal of SAE 50 lube stock in the propane fractionation of a Mid-Continent lube oil stock, said salt being dispersed in the drilling fluid and present in an amount sufficient to reduce the filtration loss of said drilling fluid.

References Cited by the Examiner

UNITED STATES PATENTS

| | | | |
|---|---|---|---|
| 2,568,992 | 9/1951 | Doscher | 252—8.5 |
| 2,862,881 | 12/1958 | Reddie | 252—8.5 |
| 2,865,957 | 12/1958 | Logan | 260—504 |
| 2,909,563 | 10/1959 | Whitney | 260—504 |
| 3,099,624 | 7/1963 | Wilson | 252—8.5 |
| 3,105,046 | 9/1963 | Fischer | 252—8.5 |
| 3,105,047 | 9/1963 | Miller et al. | 252—8.55 |
| 3,135,693 | 6/1964 | Whitney et al. | 252—33 |

OTHER REFERENCES

Schwartz et al.: Surface Active Agents, first edition, pub. 1949, by Interscience Publishers Inc., New York, pages 92, 93, and 94.

Sperling: Sulfonation Products of Mineral Oil, article in Industrial and Engineering Chemistry, vol. 40, No. 5, May 1948, pages 890 to 895.

JULIUS GREENWALD, *Primary Examiner.*

ALBERT T. MEYERS, *Examiner.*